United States Patent [19]
Ariyavisitakul et al.

[11] Patent Number: 5,794,153
[45] Date of Patent: Aug. 11, 1998

[54] ESTIMATING PCS TRAFFIC FROM RADIO PORT MEASUREMENTS

[75] Inventors: Sirikiat Ariyavisitakul, Tinton Falls; Lawrence Joel Greenstein, Edison, both of N.J.

[73] Assignee: Lucent Technologies Inc., Murray Hill, N.J.

[21] Appl. No.: 578,121

[22] Filed: Dec. 26, 1995

[51] Int. Cl.$^6$ .................................................. H04B 7/00
[52] U.S. Cl. ............................ 455/507; 455/63; 455/67.1; 455/115; 455/226.1
[58] Field of Search .............................. 455/33.1, 51.1, 455/56.1, 62, 63, 54.1, 62.1, 115, 67.5, 9; 370/335, 337, 332; 379/59

[56] References Cited

U.S. PATENT DOCUMENTS

| | | | |
|---|---|---|---|
| 5,067,173 | 11/1991 | Gordon et al. | 359/152 |
| 5,418,843 | 5/1995 | Stjernholm | 379/112 |
| 5,542,098 | 7/1996 | Bonta | 455/33.2 |
| 5,546,443 | 8/1996 | Raith | 379/59 |

*Primary Examiner*—Andrew Faile
*Assistant Examiner*—Christopher Onuaku

[57] ABSTRACT

Average local traffic load in a simulcast radio system is estimated to achieve efficient resource sharing and dynamic reconfiguration of the simulcast areas. A method for estimating the average local traffic load uses relative power measurements at each radio port (or distributed antenna element). The estimating method is applicable to both code-division multiple access (CDMA) and time-division multiple access (TDMA) systems. The method provides accurate estimates of the actual radio port traffic over various system conditions, while requiring only an approximate knowledge of the radio propagation environment.

12 Claims, 5 Drawing Sheets

ESTIMATING PCS TRAFFIC FROM RADIO PORT MEASUREMENTS

FIELD OF THE INVENTION

This invention relates generally to Personal Communication Services (PCS) technologies; and, more particularly to communication traffic measurements in such technologies.

BACKGROUND OF THE INVENTION

Personal Communication Services (PCS) technologies will be widely available for use and will be allocated a broad spectrum for increased usage capacity.

Making radio cells smaller so that the frequency spectrum can be used more often is a means for increasing traffic capacity. With smaller radio cells there is less interference with other cells in different geographical areas.

However, if the cells are small, a PCS signal has a greater likelihood of traversing a cell boundary during broadcasting, which requires a handoff to a different cell. A handoff often involves a financial transaction, delay, and transmission traffic problems.

Conventional cell systems have tall antennae for broadcasting over a broad area. In a multiport simulcasting radio system, there are many distributed antennae radiating the same signal within a simulcast group of microcells.

Groups of simulcasting microcells have the same functional capability as a larger conventional cell except that using an array of smaller antennae within a simulcast group enables uplink transmitter power to the central location to be much lower, which reduces battery consumption. The group of simulcasting microcells, wherein each microcell has a distributed antenna (radio port), can transmit at much lower power because a PCS user is always close to one of the distributed antennas, which are near the ground.

Generally, up to about ten microcells correspond to the geography of a conventional non-simulcasting cell. The several microcells simulcasting together can handle the same traffic flow as a conventional cell while consuming less power.

As a city grows rapidly, for example, a microcell of a simulcasting group may begin to process large traffic flow. A group of simulcasting microcells can be adaptable so that one or more cells, which have grown active, can be separated to form a geographically smaller simulcast group.

For large increases in traffic, the group of microcells can be broken into conventional non-simulcasting cells; or, the broken-off microcells can be assigned to a different simulcast group. When traffic levels in the various microcells become disparate, the size and/or configuration of the group of microcells can be adjusted based on the traffic increase or pattern by reassigning a microcell to a different simulcast group.

Dynamic group reconfiguration based on traffic level or traffic pattern would be enhanced with accurate calculations of the amount of traffic in each microcell so that adjustments can be accomplished with precision. There is a need to make traffic measurements for each microcell of a simulcast group so that group boundary and group size can be intelligently configured when a microcell in the simulcast group is experiencing large amounts of traffic flow.

SUMMARY OF THE INVENTION

The invention provides a means and method for measuring the traffic in each microcell of a simulcast group of microcells. In the group of simulcasting microcells, a radio port signal is received from a radio port serving a microcell. A measured power signal is generated based on the radio port signal. Radio port traffic is determined based on the measured power signal.

An illustrative embodiment of the invention provides a method for estimating PCS traffic (the number of active calls) in any microcell served by an analog-repeating radio port. Analog radio ports are grouped in a simulcast manner in a back haul infrastructure (e.g., fiber-coax) and the groupings of the ports are dynamically reconfigurable in accordance with the average traffic distribution. The average busy-period traffic in each microcell is estimated for use in achieving dynamic reconfiguration. The method is highly accurate for CDMA, FDMA, and TDMA air interfaces.

The method of estimating microcell traffic comprises making periodic computations at a base (central location), which serves the radio ports of a simulcast group where the inputs to the computation comprise (a) the known current traffic within the total group; and (b) uplink power measurements conducted for each radio port and reported to the central location. For each multiple access method (CDMA, FDMA, and TDMA), the invention is useful for estimating the traffic in each radio port using these computation inputs. The accuracy of the estimation is insensitive to the details of the radio propagation.

Other advantages and salient features of the invention will become apparent from the following detailed description, which taken in conjunction with the annexed drawing, discloses preferred embodiments of the invention.

DETAILED DESCRIPTION

Broadband analog transport using fiber or fiber/coax cable will play a significant role in providing network infrastructures for personal communications services (PCS). A multiport-simulcast system for PCS over fiber/coax allows efficient use of channel hardware resources and provides extended radio coverage through distributed antenna arrangements.

Figure 1:
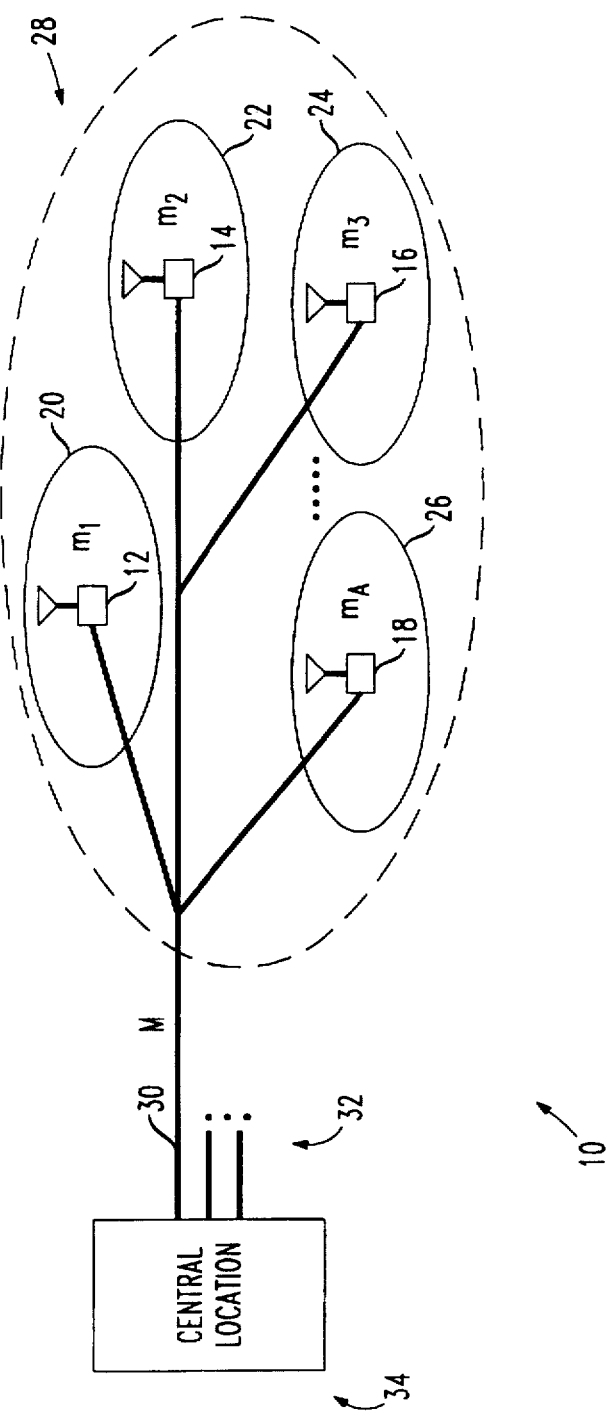
FIG. 1 is a schematic view for describing a group of simulcasting microcells communicating with a central location according to an embodiment of the invention.

Referring to FIG. 1, in a multiport-simulcast system 10, radio signals are broadcast and received from multiple, low-cost, low-power radio ports (i.e., distributed antennas) 12, 14, 16, 18 serving microcells 20, 22, 24, 26 within each simulcast group 28. The received signals are carried by a segment 30 of the shared analog broadband network 32 (which can be a single fiber/coax cable instead of a group of lines) to a central location 34.

Call processing hardware can be shared among multiple radio ports, permitting a trunking efficiency advantage. The assignment of radio ports to a simulcast group can be rearranged in a dynamic manner at the central location 34 to accommodate traffic hot spots. A multiport-simulcast system capable of dynamic reconfiguration is described in copending U.S. application Ser. No. 08/253,464, entitled "ARRANGEMENT FOR AND METHOD OF PROVIDING RADIO FREQUENCY ACCESS TO A SWITCHING SYSTEM", which is assigned to the owner of the present application and incorporated by reference as if fully set forth herein.

In order to perform efficient traffic load balancing, the central location 34 must have knowledge of how traffic is distributed among the multiple radio ports 12, 14, 16, 18 within each simulcast group 28. Given that the Erlang traffic $\overline{M}$ in an entire simulcast group area is known, the central location 34 is, according to the present invention, able to estimate the average traffic $\overline{m}_i$ in individual microcells, as shown in FIG. 1, where i=1, 2, ..., A denotes the microcell membership, and A is the number of radio ports assigned to the simulcast group 28. An illustrative embodiment of the present invention provides a method for estimating the traffic in individual microcells, which is based on signal power measurements at each radio port 12, 14, 16, 18. Such method is applicable to both code-division multiple access (CDMA) and time-division multiple access (TDMA) systems. This discussion assumes for simplicity that each radio port handles either one TDMA carrier (frequency channel) or one CDMA carrier (frequency channel). However, the principles of the invention are equally applicable to (a) multiple carrier systems and (b) FDMA systems.

Each radio port serving a microcell 20, 22, 24, 26 performs measurements of the total received signal power and reports the measured power to the central location 34 over a supervisory channel on a transport network. The supervisory channel is used for several other purposes, including simulcast group assignment (reassigning microcells to another simulcast group) and power control of transport signals. This power measurement can be obtained, for instance, from a received signal strength indicator (RSSI) at each radio port 12, 14, 16, 18.

If the measured power at the i-th radio port is denoted $r_i$; and, the total received power at all the radio ports in a simulcast group is denoted R; then $R=\Sigma r_i$ for i=1 to A. The central location 34 estimates the (instantaneous) number of calls $m_i$ in the i-th microcell, for each i from 1 to A, based on the following traffic estimation formulas for CDMA and TDMA systems.

For a CDMA system:

$$m_i = (r_i/R) \cdot M \cdot (S/s) \cdot (1+F) - <\overline{M}>f \quad (1)$$

For a TDMA system:

$$m_i = (r_i/R) \cdot M \quad (2)$$

where M is the total number of calls in the simulcast group 28, which is known by the central location 34; $<\overline{m}>$ is a known statistic, namely the average of $\overline{m}_i$ over all microcells; and S/s, F, and f are empirically derived parameters which can be precalculated. The parameter values are related to the propagation model and the group size A.

In an exemplary embodiment for a group size A=4, S/s=1.1, F=0.28, and f=0.44. In another exemplary embodiment for a group size A=4, S/s=1.2, F=0.52, and f=0.77. In an exemplary embodiment for a group size A=9, S/s=1.1, F=0.19, and f=0.41. The accuracy of the estimation technique does not greatly vary with use of these parameters, however.

A further refinement is possible for CDMA by renormalizing the estimates of $m_i$ derived using Eq.(1) such that: $\Sigma m_i$ =M for i=1 to A, for every simulcast group after renormalization. Such a refinement leads to improvement in the estimation accuracy.

The renormalization is not necessary for TDMA; that is, the estimate of $m_i$ in Eq.(2) always sums to M in each group because: $\Sigma r_i$ =R for i=1 to A.

The illustrative embodiment is based on the relative power measurement $r_i/R$ and, thus, does not require precise calculation of the measured signal power.

It is also assumed that the measured power $r_i$ does not include thermal noise power. The thermal noise power can be measured in advance during low traffic hours (e.g., at 2 am) and discounted from the actual measured power $r_i$.

In Equations (1) and (2), $m_i$ is the instantaneous number of calls in the i-th microcell of a simulcast group. User membership in a microcell is based on the actual path loss; that is, a user belongs to microcell i if the radio link from the user to port i serving the microcell i has the lowest local-mean attenuation (including shadow fading) among radio links to all radio ports. A call belongs to the microcell to whose port it delivers the most (locally-averaged) power, not to the microcell whose port is closest.

The average of $m_i$, over a reasonable time period (e.g., the busiest nine hours of a day), can be derived in terms of quantities that can be measured or estimated. An estimator for the instantaneous value of $m_i$ can be inferred from the resulting formula to arrive at Equations (1) and (2), as we now show.

In a CDMA system, the total received signal at each radio port (without noise) includes signals from same-cell users and those from other-cell users. The average received power $\overline{r}_i$, where the averaging is over traffic, user position, and path loss variations, can be given as $$\overline{r}_i = \overline{m}_i s + <\overline{m}>s f \quad (3)$$

where s is the average received power of each user at the radio port to which the user "belongs"; $<\overline{m}>$ is the average traffic per microcell, averaged over all microcells as described earlier; and f is the ratio of average other-cell to average same-cell interference.

Similarly, the average total received power from all radio ports in a simulcast group can be given as $$\overline{R} = \overline{m} \cdot S \cdot (1+F) \quad (4)$$

where S is the average received power of each user at all simulcasting radio ports, and F is the ratio of average other-group to average same-group interference. It is assumed in Eq. (4) that traffic is well balanced between different simulcast groups such that $\overline{M}$ is the same for all simulcast groups (which is the outcome attained by the preferred embodiment described herein).

Dividing (3) by (4) and solving for $\overline{m}_i$, we obtain $$\overline{m}_i = (r_i/R) \cdot \overline{M} \cdot (S/s) \cdot (1+F) - <\overline{m}>f \quad (5)$$

To estimate the instantaneous number of calls in the i-th microcell, the overbars are removed from the short-term measurables $r_i$, R, and M in Equation (5). This yields (1), and $\overline{m}_i$ is estimated by computing many samples of $m_i$ over time and then computing the average of the samples. Although the average over ($r_i M/R$) implicit in the above approach is not identical to ($\overline{r_i M/R}$) in Eq. (5), experimental simulation has proved its accuracy.

Experimental simulations with CDMA propagation models show that the estimated and actual values of $\overline{m_i}$ lie within 15% of each other over a broad range of conditions and assumptions. The probability distributions of the actual and estimated $m_i$ are quite close, and even their instantaneous values differ by a small standard deviation, which is <1 in nearly all cases.

In TDMA systems without tight power control, near-far problems can cause the received signal power of each user to have a large variance. Thus, any method based on power measurement in a TDMA system will not be as accurate an estimator as in power-controlled CDMA systems. While the method taught herein is less effective in predicting instantaneous estimates and the probability distribution of the instantaneous estimates, an estimator based on Equation (2) is quite accurate in estimating the mean (average) traffic in a radio port 12, 14, 16, 18 serving a microcell (FIG. 1). As a practical matter, the average traffic per radio port is the most important metric for dynamic reconfiguration purposes.

To arrive at Equation (2), the average of $m_i$ as a function of $\overline{M}$, $\overline{r_i}$, and $\overline{R}$, is derived similarly to that for CDMA. However, (a) out-of-cell signal power is ignored, i.e., it is assumed that each user delivers power only to the radio port in the microcell to which it "belongs", and not to any other radio port; and (b) cochannel interference power, which is usually much smaller than the desired signal power for TDMA, is ignored.

When these factors are ignored, we obtain the following relationships:

$$\overline{r_i} = \overline{m_i} \cdot s \quad (6)$$

$$\overline{R} = \overline{M} \cdot s \quad (7)$$

Solving the above equations yields $$\overline{m_i} = (\overline{r_i}/\overline{R}) \cdot \overline{M} \quad (8)$$

The overbars from all the variables in Equation (8) are removed to arrive at Equation (2). Note that $r_i$ in this case indicates the received power averaged over all TDMA time slots.

The illustrative embodiments of the invention were tested by simulation. Nonuniform microcell traffic was incorporated in the simulation model to examine its effect on the estimation of the mean traffic in a microcell radio port. Traffic was divided unequally among microcells for several simulcast groups having the same group size and same total group traffic, (i.e., well-balanced group traffic).

A well-known formula for the standard deviation of a mean estimated from repeated trials is used to determine the averaging time required in the estimation process:

$$\sigma_{em} = (\sigma_m)/(\sqrt{N}) \quad (9)$$

Here, $\sigma_{em}$ denotes the standard deviation of the estimated mean of $m_i$; $\sigma_m$ is the true standard deviation of the underlying distribution of $m_i$; and N is the number of trials.

The value of $\sigma_m$ predicted from simulations (with 5000 samples) is about 1.0 to 3.5 for CDMA, and is about 2.0 to 5.0 for TDMA. Thus, for example, if we want the standard deviation $\sigma_{em}$ of the mean traffic estimate to be below 0.2, the number of samples taken for subsequent averaging must be greater than 625.

In reality, independent samples would be separated roughly by the interarrival time of calls. For an average microcell traffic of about 2 Erlangs and a typical average service time of 100 seconds, the interarrival time should be about 50 seconds. Given that $N \geq 625$ is required, the averaging time should be at least about 9 hours (625×50 seconds≈8.68 hours). The service provider thus should pick 9 busiest (not necessarily contiguous) hours in the day or the week to perform such an estimation.

Figure 2:
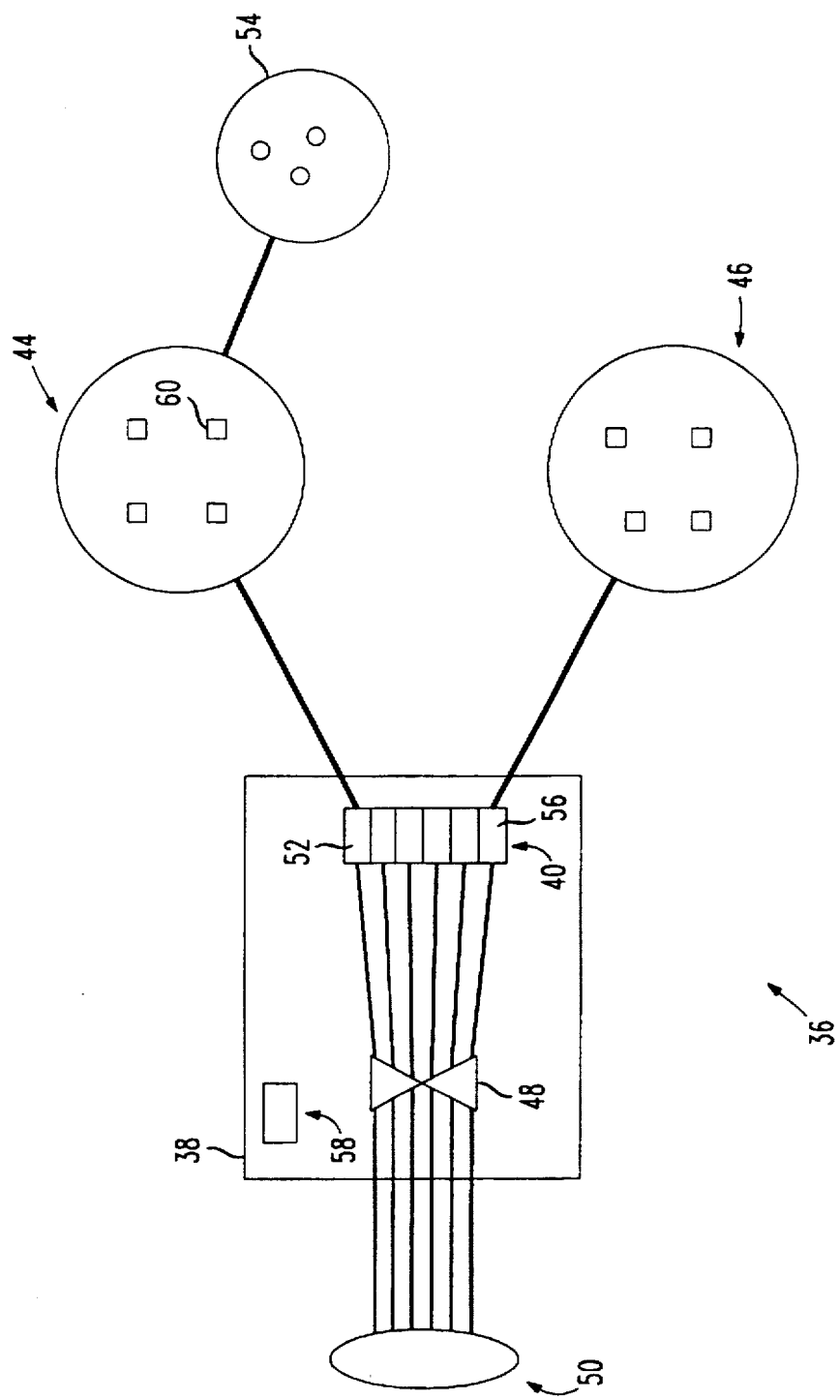
FIG. 2 is a schematic view for describing a central location which can dynamically reconfigure groups of simulcasting microcells according to an embodiment of the invention.

Practice of the invention will be described in an illustrative simulcasting group embodiment. Referring to FIG. 2, a PCS system 36 provides dynamic allocation of hardware resources and frequency spectrum at a central location 38. The central location 38 comprises a pool of radio transceivers 40 acting as group servers. Each group server is dedicated to a simulcasting group of microcells 44, 46. The group servers are coupled at a point of presence 48, for example an electronic switching system, to a public switched telephone network 50. Each radio transceiver at the central location 38 is coupled for communicating with the radio ports of a simulcasting group 44, 46.

A first group server 52 at the central location has a maximum traffic capacity C for communicating to a first simulcast group of radio ports 44. Each radio port of the first simulcast group 44 is arranged to provide radio access to one or more members of a set of radio users 54. The same information is radiated by all the radio ports of the first group 44 to the set of radio users 54. Information radiated from each of the set of radio users is received by one or more radio ports of the first simulcast group 44. The traffic capacity C is shared among the set of radio users 54. A second group server 56 communicates with a second simulcast group 46 of radio ports.

The central location 38 comprises an assignment control processor 58. The assignment control processor 58 communicates with the first simulcast group 44 of radio ports and is able to dynamically change an assignment of a radio port 60 from the first group server 52 to the second group server 56 at the central location 38.

In operation, the assignment control processor 58 communicates with the first simulcast group 44 of radio ports to monitor and process load conditions at the simulcasting radio ports. Based on such monitoring and processing, the assignment control processor 58 dynamically changes an assignment of the radio port 60 from the first group server 52 to the second group server 56 based on the measured communications traffic at the radio port 60, such as when the number of active users in the first simulcast group 44 of radio ports approaches the maximum traffic capacity C of the first group server 52. This effectively reassigns the radio port 60 from the first simulcast group 44 to the second simulcast group 46. This can be done by reprogramming the frequency synthesizer at radio port 60.

Figure 3:
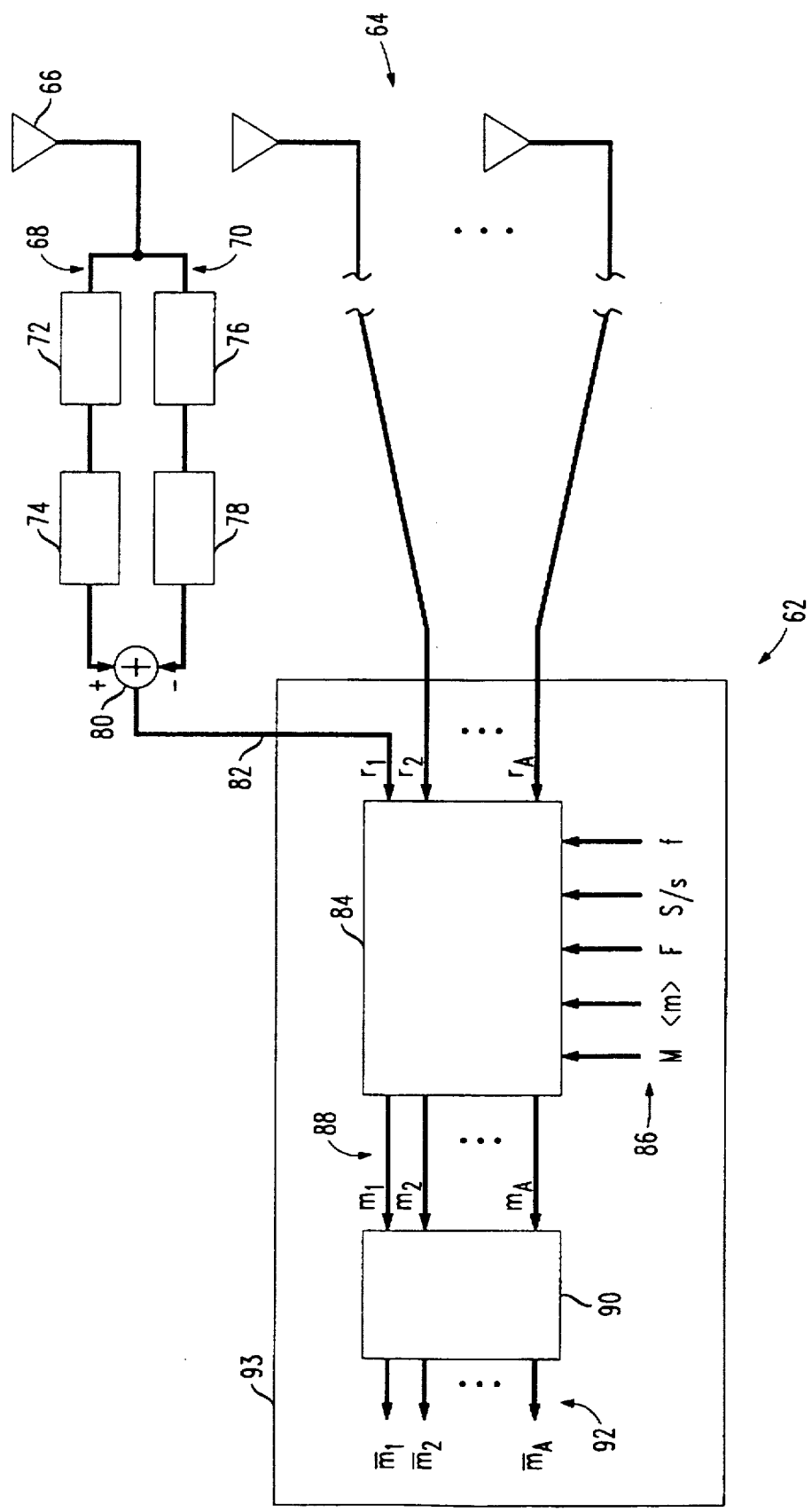
FIG. 3 is a schematic view for describing a system for measuring the number of calls in progress at a radio port of a simulcast group for a CDMA system according to an embodiment of the invention.

FIG. 3 depicts a system 62 for measuring the number of calls in progress (number of present users) at a radio port of a simulcast group for a CDMA system. A set 64 of radio ports, 1 to A, serve respective microcells, 1 to A, of a simulcasting group. Received CDMA signals at each radio port 66 are passed through two parallel signal processing branches 68, 70.

A first signal processing branch 68 comprises a narrowband filter 72, centered around the expected signal band (e.g., 1.25 MHz). The narrowband filter 72 samples the received signal power plus the noise power. The output of the signal band filter 72 is coupled to a first received signal strength indicator (RSSI) 74, which is operable to generate a first RSSI signal proportional to the power of both the signal and the noise received at the radio port.

A second signal processing branch 70 comprises a narrowband filter 76 centered within a guard band; that is, a portion of the spectrum that avoids the frequency band of the received CDMA signals. The guard band filter 76 operates to sample the noise power and to generate a noise power output. The noise power output from the guard band filter 76 is passed to a second received signal strength indicator (RSSI) 78. The second RSSI 78 operates to generate a second RSSI signal which is proportional to the power of the noise component of the received signal.

A summation circuit component 80 receives the first RSSI signal and the second RSSI signal and operates to subtract the second RSSI signal from the first RSSI signal to generate a measured power signal $r_i$ 82 which is proportional to the power of the CDMA signals (without the noise component) received by the radio port 66. The system 62 collects this information (the measured power signal $r_i$ for i=1 to A) from each of the set 64 of radio ports, 1 to A. Because what is required is a proportional estimate of the power, and not the actual power, the system 62 is able to use an RSSI instead of a more expensive power meter.

The variable measured power signal 82 $r_i$, for i=1 to A, are presented as input to a measurement processor 84. The measurement processor 84 also receives fixed empirically-derived input 86 parameters M, <m>, F, (S/s), and f. "F" represents other-group interference. "S/s" represents signal leakage into other ports. "f" represents other-cell interference.

The measurement processor 84 is operative based on Eq. (1) to generate a set 88 of measurement outputs $m_i$, for i=1 to A. Each measurement output $m_i$ represents an estimate of the instantaneous traffic being handled by its corresponding radio port of the simulcast group. The term "traffic" denotes the number of calls in progress (the number of present users communicating with the radio port).

The set 88 of measurement outputs $m_i$, for i=1 to A, provides an accurate and useful estimate, which can be used without further signal processing, of the traffic at a radio port serving a microcell for a CDMA system.

Further traffic measurement processing in the CDMA system is provided by passing the set 88 of measurement out-puts $m_i$, for i=1 to A, to an accumulator (or an integrator) circuit 90. The accumulator 90 receives each measurement output of the set 88 of measurement outputs as an input; samples each measurement output at fixed intervals of time (such as every minute) to accumulate measured output samples; and, stores the samples in a memory register or other means for storing data.

Every sampling interval, the memory register is updated and the accumulated sampled values are averaged based on the elapsed time since the start of sampling. The accumulator 90 operates to generate a set 92 of averaged outputs $\overline{m}_i$, for i=1 to A, which is a set of estimates of the average traffic handled by each radio port, over time.

In operation for a CDMA system, each radio port 66 feeds the CDMA signal to parallel processing branches 68, 70. The first branch 68 accomplishes narrowband filtering centered on the signal spectrum. The first filtered output is passed to the first RSSI 74 which generates an estimate of the power of the received signal plus noise. The second branch 70 performs narrow band filtration centered in a guard band to sample only the noise. The second filter output is passed to the second RSSI 78 which generates an estimate proportional to the received noise power.

The second RSSI signal on the second branch 70 is subtracted from the first RSSI signal on the first branch 68 to generate a measured power signal $r_i$ 82. This is performed for every radio port, for i=1 to A, in the simulcast group.

All of these measured power signals for all of the radio ports are passed to the measurement processor 84 in the central location 93. The measurement processor 84 combines these measured variable power inputs with the fixed empirically derived input parameters and operates to estimate the instantaneous number of calls in progress in each radio port serving a microcell of the simulcast group.

Each estimate of the instantaneous traffic for each radio port is fed to the accumulator 90 which estimates the average number of calls in each radio port over a preselected time period or periods.

Figure 4:
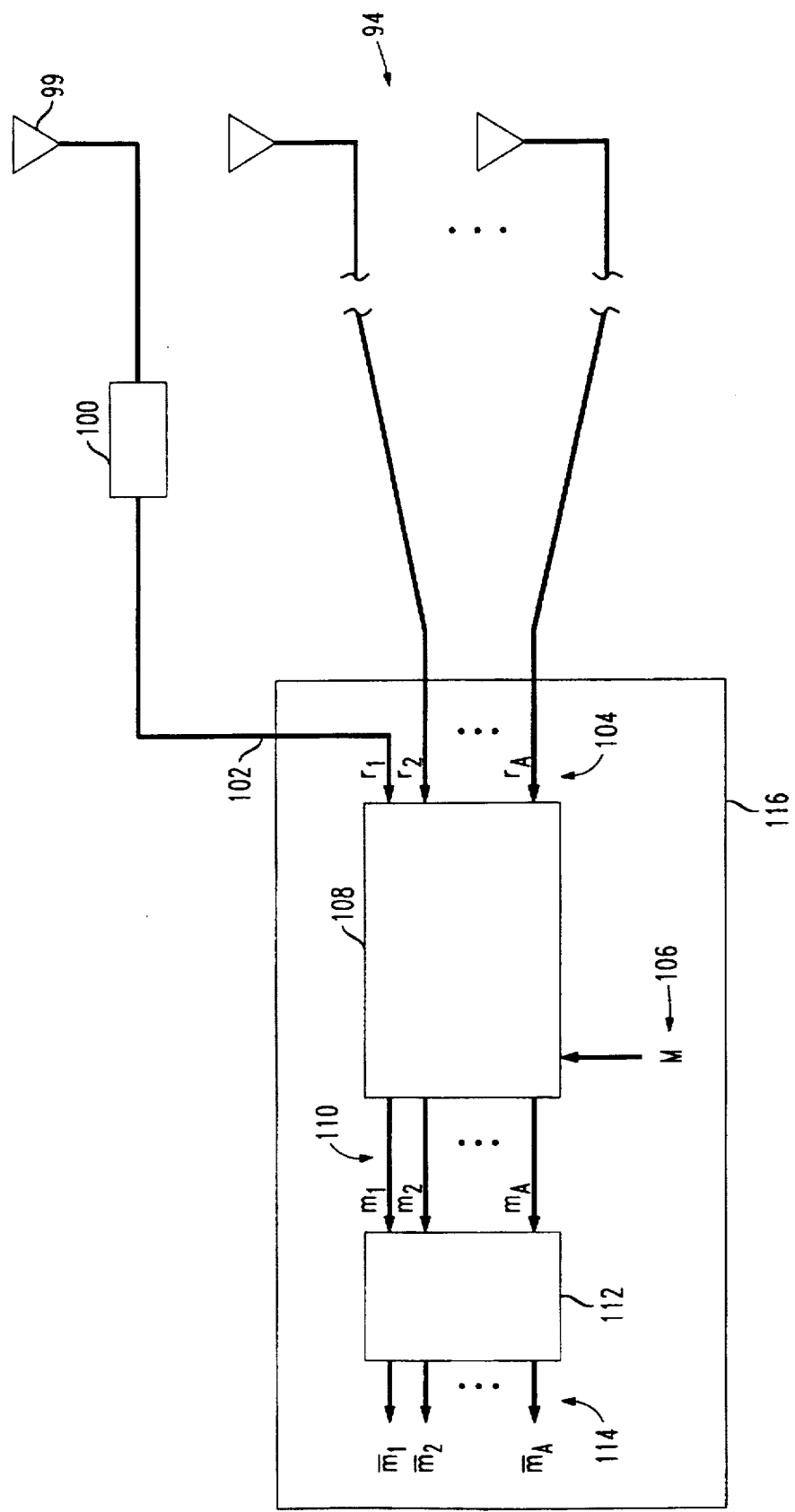
FIG. 4 is a schematic view for describing a system for measuring the number of calls in progress at a radio port of a simulcast group for a TDMA system according to an embodiment of the invention.

FIG. 4 depicts a simulcast group embodiment of the invention for use in a TDMA system. One or more radio ports 94, 1 to A, each serve an associated microcell, 1 to A, in a simulcast group.

Figure 5:
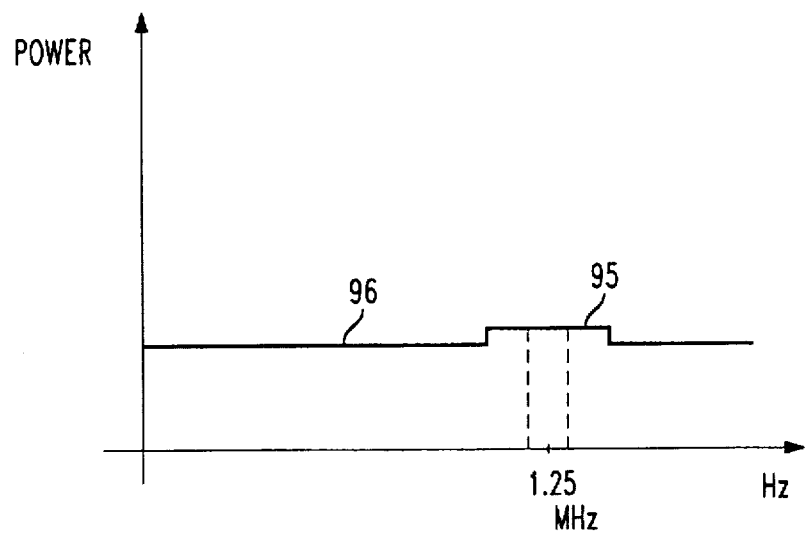
FIG. 5 is a graph for describing the signal spectral density to noise spectral density ratio for a CDMA system.

The system depicted in FIG. 3 for a CDMA system will work effectively in a TDMA system. However, certain structural complexities in such a CDMA system can be eliminated for use in a TDMA system. Because CDMA involves very broad band signal propagation, there is a low ratio of signal spectral density 95 to noise spectral density 96 over the propagation band as shown in FIG. 5. In a CDMA system, the second RSSI 78 (FIG. 3) is used in the second branch 70 of the parallel branches to remove the noise power from the measured power signal $r_i$ calculation because of this low power spectral density.

Figure 6:
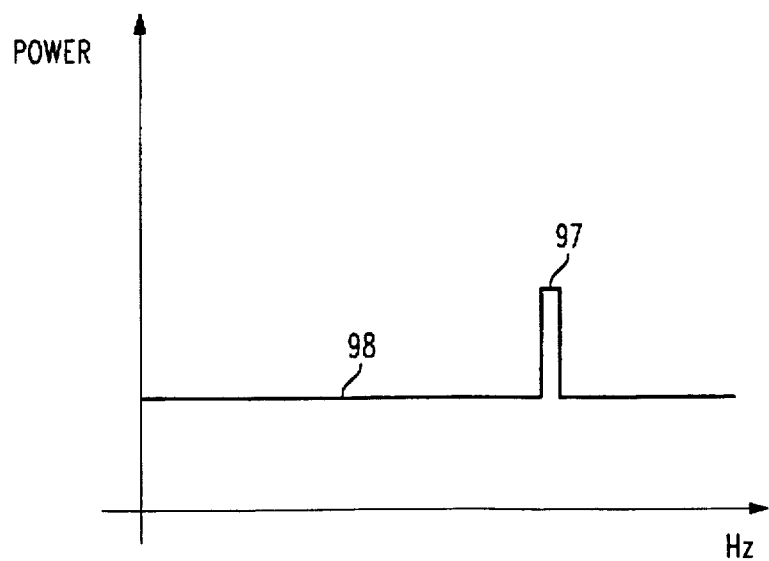
FIG. 6 is a graph for describing the signal spectral density to noise spectral density ratio for a TDMA system.

Because TDMA involves narrow band signal propagation as shown in FIG. 6, a TDMA signal received at a radio port presents a high signal spectral density 97 to noise spectral density 98 ratio. Therefore, parallel RSSI units for each radio port channel are not necessary in the preferred TDMA embodiment.

Received TDMA signals at a radio port 99 are passed to a received signal strength indicator (RSSI) 100 which operates to generate an estimated measured power signal 102 $r_i$ proportional to the received signal power at the radio port 99. Each radio port generates a measured power signal 102 $r_i$, for i=1 to A, using a similarly-structured channel.

The set 104 of variable measured power signals $r_i$ is presented along with a preselected fixed input 106 parameter M to a measurement processor 108. The fixed input parameters <m>, F, (S/s), and f used in the CDMA system embodiment are not necessary input to the measurement processor 108 in the TDMA system. Thus, in the preferred embodiment, the measurement processor is responsive to $r_i$, for i=1 to A, and the input parameter M 106 to generate a set 110 of estimated instantaneous traffic measurements $m_i$ for each radio port, 1 to A.

The set 110 of estimated instantaneous traffic measurements $m_i$ is presented as input to an accumulator/integrator 112 which samples instantaneous traffic measurements for each radio port periodically over time to update an average traffic measurement for each port. The accumulator 112 is operative to generate a set 114 of estimated average traffic measurements $\overline{m}_i$ for each radio port of the simulcast group.

In operation in a TDMA environment, a power estimate 102 for each radio port serving a microcell of the simulcast group is delivered to the measurement processor 108 in the central location 116. The measurement processor 108 receives this set of measured power estimate inputs in combination with the fixed input parameter M 106 representing the current number of total calls in progress in the simulcast group.

The measurement processor 108 generates a set 110 of estimates of the instantaneous number of calls in progress for each radio port serving a microcell of the simulcast group. These instantaneous estimates 110 are passed to an accumulator 112 which estimates the average number of calls in progress over a preselected busy hour period (i.e., nine hours) for each microcell. Because there are often peak hours of communications traffic during a day, the averaging process can be conducted at selected time periods which are not necessarily contiguous.

Application of the present invention for CDMA and TDMA systems enables the central location 38 (FIG. 2) to effectively dynamically control the assignment of radio ports to the pool 40 of group servers. Radio ports assigned to a simulcast group 44 can be reassigned by the assignment control processor 58 to another simulcast group 46 in response to a predetermined communications traffic level, such as when the number of active users 54 in the first simulcast group 44 of radio ports approaches the maximum traffic capacity of the first group server 52.

From the foregoing discussion, it will be appreciated that the invention fulfills a need for estimating the local traffic load in a simulcast radio system. The preferred embodiment of the invention, based on relative power measurements at each radio port, is applicable to both CDMA and TDMA systems and is operable over a broad range of system conditions to provide estimates within 15% of the actual traffic load requiring only an approximate knowledge of the radio propagation environment. The combination of simplicity, accuracy and robustness makes the invention a valuable approach for achieving an important function in Personal Communications Services (PCS) using simulcasting networks.

While advantageous embodiments have been chosen to illustrate the invention, it will be understood that various changes and modifications can be made therein without departing from the scope of the invention as defined in the appended claims.

What is claimed is:

1. A method for measuring radio port traffic in a group of simulcasting microcells, comprising the following steps:

(A) receiving a radio port signal from a radio port serving a microcell;

(B) generating a measured power signal based on the radio port signal; and (C) determining the radio port traffic based on the measured power signal; wherein step (B) comprises:
filtering the radio port signal at a signal band to generate a first signal power sample,
filtering the radio port signal at a guard band to generate a second signal power sample, and
subtracting the second signal power sample from the first signal power sample to generate the measured power signal.

2. A method according to claim 1, wherein step (C) comprises the steps:
estimating an instantaneous radio port traffic based on the measured power signal; and
estimating an average radio port traffic based on the instantaneous radio port traffic.

3. A method according to claim 1, further comprising the steps:
reassigning the radio port to a different group of simulcasting microcells based on the radio port traffic.

4. A method according to claim 1, wherein step (C) comprises the step:
estimating an instantaneous radio port traffic based on the measured power signal and the total traffic in the group of simulcasting microcells.

5. A method according to claim 4, wherein step (C) further comprises the step:
normalizing the estimated instantaneous radio port traffic using a relative power ratio.

6. A method according to claim 5, further comprising the step:
reassigning the radio port to a different group of simulcasting microcells based on the estimated instantaneous radio port traffic.

7. A method according to claim 1, wherein:
the radio port signal conforms to a system selected from the group consisting of CDMA and TDMA.

8. A method according to claim 1, wherein:
the measured power signal is a proportional estimate of the power of the radio port signal.

9. A radio port traffic measurement system, comprising:
means for generating a measured power signal responsive to receiving a radio port signal from a radio port; and
means for determining the radio port traffic based on the measured power signal; wherein the means for generating comprise:
a first filter for filtering the radio port signal at a signal band,
a first RSSI coupled to the first filter for sampling the power of the radio port signal at the signal band
a second filter for filtering the radio sort signal at a guard band,
a second RSSI coupled to the second filter for sampling the power of the radio port signal at the guard band, and
a subtractor coupled to the first RSSI and to the second RSSI for generating the measured power signal.

10. A system according to claim 9, wherein the means for determining comprise:
a measurement processor for generating an estimate of the instantaneous radio port traffic at the radio port responsive to the measured power signal.

11. A system according to claim 10, wherein the means for determining further comprise:
an accumulator for generating an estimate of the average radio port traffic at the radio port based on periodic samples of the estimate of the instantaneous radio port traffic.

12. A system according to claim 9, wherein:
the radio port signal conforms to a system selected from the group consisting of CDMA and TDMA.

* * * * *